Dec. 19, 1950     N. G. A. MALMQUIST     2,534,981
RESILIENT CONNECTION
Filed Sept. 23, 1946
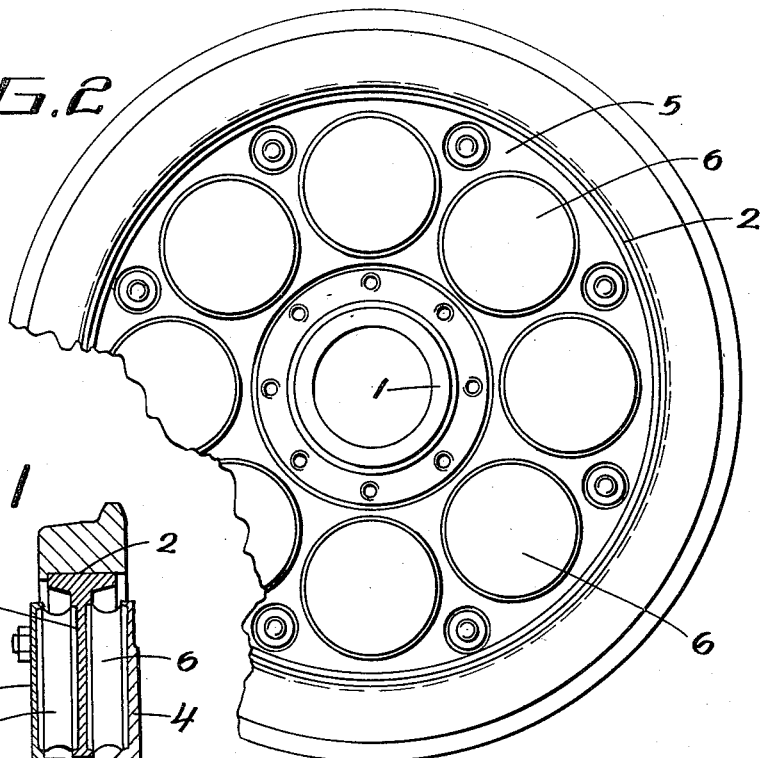
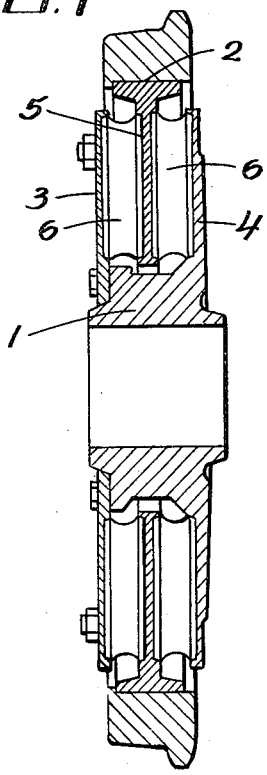
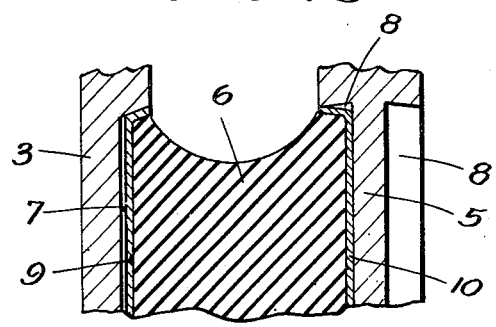
Inventor:
N. G. A. Malmquist
By E. F. Wenderoth
atty Patented Dec. 19, 1950

2,534,981

UNITED STATES PATENT OFFICE 2,534,981

RESILIENT CONNECTION

Nils Gunnar August Malmquist, Malmo, Sweden, assignor to Svenska Aktiebolaget Bromsregulator, Malmo, Sweden, a corporation of Sweden Application September 23, 1946, Serial No. 698,618
In Sweden October 2, 1945

4 Claims. (Cl. 64—11)

This invention relates to resilient connections between spaced members relatively movable about an axis and also in the direcion of said axis as well as at right angles thereto. These relatively movable spaced members may form parts of a wheel, a shaft coupling or the like. The resilient connections serve the purpose of absorbing or reducing shocks to which the wheel, the shaft coupling or the like may be subjected during use, and comprise resilient non-metallic blocks preferably of rubber or the like and of circular cross section, which are clamped between the relatively movable spaced members, each block having its ends fitted within normally aligned circular recesses in the facing sides of the relatively movable spaced members.

Constructional forms of resilient wheels, shaft couplings or the like having resilient connections of the kind herein referred to are shown and described for instance in the Swedish Patents Nos. 88,442 and 100,046 and in the U. S. Patents Nos. 2,220,417 and 2,263,884. These resilient connections are characterized inter alia by the fact that the resilient blocks serving the purpose of resiliently transmitting the load on the wheel, shaft coupling or the like between the relatively movable spaced members thereof, are so clamped between these members that the blocks are under an axial compressive stress that is high in relation to the maximal load which the blocks will have to transmit between the relatively movable spaced members of the wheel, shaft coupling or the like during use. This high axial compression of the resilient blocks serves the purpose of preventing motion, especially rotation and clacking or gaping, of the ends of the blocks in the circular recesses for the same in the facing sides of the relatively movable spaced members between which the blocks are clamped, such motion having been found to result in a relatively rapid destruction of the rubber of the blocks. The high axial compression of the clamped rubber blocks also serves the purpose of making it possible to give the blocks such dimensions that the ends of the blocks are easily insertable into the recesses for the same as long as the blocks during the assembling of the wheel, shaft coupling or the like are in a free or uncompressed state. Obviously the high axial compression of the clamped blocks can serve these purposes only as long as it stands good, i. e. as long as it is not materially reduced by ensuing permanent changes in the form of the blocks or by the rubber of the blocks decoming fatigued. How long the initial axial compression of the rubber blocks will stand good depends, besides on the specific value of the compression and on the shape of the rubber blocks, to an essential degree on the quality of the rubber from which the blocks are made. In addition, the clamping pressure on the blocks may change with the temperature as a result of differences in the heat expansion properties of the rubber of the blocks and of the construction material used in other parts of the wheel, shaft coupling or the like, so that the clamping pressure on the blocks falls in cold weather. Especially if the rubber blocks have to be made from regenerated rubber or other rubber of a lower quality than that to be preferred if available, it has been found that the ends of the rubber blocks in spite of the high initial clamping pressure used, will not remain seated firmly and immovably in the recesses for the same so safely or for so long a time as would be desirable.

The invention has for its object to provide a remedy for this disadvantage, and for this object and such further objects as may appear from the following description and the references made therein to the accompanying drawing, the invention consists in a resilient connection of the kind herein referred to, in which the rubber blocks have their ends tipped with preferably cupshaped metallic plates, and in which these metallic tips and the circular recesses for the tipped ends of the rubber blocks are of such shapes and relative dimensions that the metallic tips on the ends of the blocks will receive bearing contact in the recesses substantially only along the periphery of the recesses and, nevertheless, will support the rubber of the blocks over substantially the whole area of the end surfaces of the blocks. By this arrangement is obtained a substantially uniform distribution of the supporting pressure of the metallic tips on the rubber of the blocks over the whole area of the end surfaces of the blocks and, nevertheless, a concentration of the bearing contact, and thus of the contact pressure, of the metallic tips in the recesses substantially to the periphery thereof, whereby the friction resulting from the contact and pressure between the metallic tips and the walls of the recesses will be much more effective for preventing rotation and other deleterious motion of the ends of the rubber blocks in the recesses for the same.

These and other features and advantages of the invention will be fully understood by those skilled in the art from the following description of an embodiment of the invention illustrated on the accompanying drawing in which:

Fig. 1 is an axial section of a wheel having relatively movable spaced rim and hub flanges resiliently connected by means of rubber blocks of circular cross section clamped between the flanges and having their ends fitted within normally aligned circular recesses in the facing sides of the flanges.

Fig. 2 is a side view of the wheel with one of the hub flanges removed.

Fig. 3 is an axial detail section of one of the rubber blocks and adjacent portions of the flanges between which the block is clamped.

Referring to the drawing, 1 denotes the hub and 2 the rim of the wheel. The hub 1 has two outwardly extending flanges 3 and 4. The hub flange 3 is detachable and secured in place by means of bolts. The rim 2 has an inwardly extending flange 5 located between the two hub flanges 3 and 4 and resiliently spaced therefrom and connected therewith by means of rubber blocks 6 of circular cross section. The rubber blocks 6 are clamped between the relatively movable spaced flanges so that the blocks are under an initial axial pressure that is high in relation to the maximal load which the blocks will have to transmit resiliently between the rim and the hub of the wheel during use. The hub flanges 3, 4 and the intermediate rim flange 5 are provided in their facing sides with normally aligned circular recesses 7 and 8, respectively, within which the ends of the rubber blocks 6 are fitted. Preferably the periphery of the circular recesses is conical, and preferably the periphery of the recesses 7 in the hub flanges 3 and 4 tapers towards the bottom of the recesses, whereas the periphery of the recesses 8 in the rim flange 5 tapers towards the edge of the recesses, as suggested in the U. S. Patent No. 2,220,417. It is to be noted, however, that these preferred conical forms of the peripheries of the recesses 7 and 8 are not absolutely necessary for the principal purpose of the invention, it being possible to give the periphery of the recesses also other forms, for instance a cylindrical form. The ends of the rubber blocks 6 fitted within the recesses 7 and 8 are tipped with preferably cup-shaped metal plates 9 and 10, respectively, which are firmly secured, preferably vulcanized, to the rubber blocks. These metallic tips 9 and 10 and the recesses 7 and 8, respectively, are of such shapes and relative dimensions that the metallic tips on the ends of the blocks 6 will receive bearing contact in the recesses substantially only along the periphery thereof and, nevertheless, will support the rubber of the blocks over substantially the whole area of the end surface of the blocks. Obviously, to obtain this function of the metallic tips 9 and 10, they must be of a sufficient strength and stiffness for withstanding the pressure from the rubber of the blocks without yielding to any such degree as would result in the tips receiving any material bearing contact with the bottom of the recesses in the flanges between which the blocks are clamped and are under the aforesaid high axial pressure. The principal idea of the invention is to concentrate, to a substantial degree at least, the bearing contact, and thus the contact pressure, of the metallic tips 9 and 10 of the blocks 6 in the recesses 7 and 8, respectively, to the periphery of the recesses and the tips, for the purpose of more effectively utilizing the friction resulting from the bearing contact and pressure between the tips and the walls of the recesses for preventing rotation and other deleterious motion of the ends of the rubber blocks in the recesses which serve to hold the ends of the rubber blocks. Preferably the metallic tips 9 and 10 are in the shape of shallow cups having a conical edge portion with bearing contact against the conical periphery or edge of the recesses 7 and 8, respectively, as shown in Fig. 3.

For facilitating the re-assembling of the wheel when it has been dismounted for inspection of the rubber and for renewal of any worn-out or damaged rubber blocks, it is preferred to give the recesses 8 in the rim flange 5 and the edge portion of the cup-shaped tips 10 to be fitted into these recesses such shapes and relative dimensions that the rubber blocks may be driven with their said tips 10 into the said recesses 8 and will then without further ado remain in their places on the rim flange 5 during the continued reassembling work which consists in first bringing the rim flange 5 and the rubber blocks carried on one side thereof in place in relation to the hub flange 4 and then bringing the detachable hub flange 3 in place in relation to the rim flange 5 and the rubber blocks carried on the other side thereof. For this purpose the conical edge portion of the cup-shaped tips 10 should taper slightly towards the bottom of the cup, as shown in Fig. 3, whereas the conical edge portion of the cup-shaped tips 9 should taper so much towards the bottom of the cup that the tips 9 will not become jammed in the recesses 7 and thus will be easily removable from the recesses 7 in the dis-mounting of the wheel.

The described conical shapes of the edge portions of the cup-shaped tips 9 and 10 result in an increase of the contact pressure occurring between these edge portions and the periphery or edge of the recesses 7 and 8, respectively, and arising from the axial clamping pressure on the rubber blocks between the relatively movable spaced flanges 3, 4 and 5. The said increase of the said contact pressure results in a corresponding increase of the friction between the tips and the walls of the recesses for the ends of the rubber blocks, which friction acts to hold the ends of the rubber blocks against rotation and other deleterious motion in the recesses and is the more effective for this purpose, the higher it is and the more concentrated to the periphery of the tips and the recesses it is.

So as to avoid misunderstandings as regards the essence and novelty of the invention it should be noted that the invention does not consist in the securing of metallic members by vulvanization, or in any equivalent manner, onto the surfaces of the rubber where it bears on the relatively movable members between which it is clamped, because this is known per se from, for instance, the Swedish Patent No. 100,046. Nor is any claim made herein for the mere housing of the ends of the rubber blocks within cup-shaped metallic members fitting within circular recesses in the facing sides of the relatively movable members which the rubber blocks serve to connect resiliently with one another, because also this is known per se from, for instance, the U. S. Patent No. 1,884,780.

What I claim and desire to secure by Letters Patent is:

1. In resilient connections between spaced members relatively movable about an axis and in the directions of said axis as well as at right angles thereto, the combination comprising nonmetallic resilient blocks of circular cross section, clamped in an axially compressed state between the relatively movable spaced members, and relatively non-yielding metallic members firmly secured to and tipping and supporting the ends of said non-metallic resilient blocks over substantially the whole area of the end surfaces thereof, the relatively movable spaced members being provided at their facing sides with normally aligned circular recesses for receiving the tipped ends of said blocks, said non-yielding tipping members being cup-shaped with conical side walls of so great an outer diameter that, at the insertion of the blocks, said conical side walls will abut the peripheries of the recesses before the end surfaces of the tipping members touch the bottoms of the recesses.

2. In resilient connections as claimed in claim 1 wherein the conical side walls of two tipping members at the two ends of each of said resilient blocks as well as the peripheries of the two recesses within which said two tipping members extend are differently shaped so that only one of said two tipping members is liable to jam in the recess for the same.

3. In resilient connections as claimed in claim 1 wherein said recesses are shaped so that contact between said conical side walls of said tipping members and said recesses takes place substantially only along the periphery thereof.

4. In resilient connections as claimed in claim 1 wherein certain of said recesses are undercut so that contact between said conical side walls of said tipping members and said recesses takes place only at the outer edge of said recesses.

NILS GUNNAR AUGUST MALMQUIST.

REFERENCES CITED

The following references are of record in the file of this patent:

UNITED STATES PATENTS

| Number | Name | Date |
|---|---|---|
| 1,884,780 | MacLean | Oct. 25, 1932 |
| 2,220,417 | Malmquist | Nov. 5, 1940 |
| 2,263,884 | Malmquist | Nov. 25, 1941 |